United States Patent
Rajput et al.

(10) Patent No.: US 11,843,580 B2
(45) Date of Patent: Dec. 12, 2023

(54) METHODS, SYSTEMS, AND COMPUTER READABLE MEDIA FOR PLATFORM FIREWALL MANAGEMENT BY NETWORK FUNCTION (NF) REPOSITORY FUNCTION (NRF) OR SERVICE COMMUNICATION PROXY (SCP)

(71) Applicant: Oracle International Corporation, Redwood Shores, CA (US)

(72) Inventors: Jay Rajput, Bangalore (IN); Virendra Singh, Bangalore (IN); Ankit Srivastava, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 111 days.

(21) Appl. No.: 17/308,018

(22) Filed: May 4, 2021

(65) Prior Publication Data
US 2022/0360561 A1  Nov. 10, 2022

(51) Int. Cl.
H04L 9/40 (2022.01)

(52) U.S. Cl.
CPC ...... *H04L 63/0263* (2013.01); *H04L 63/0227* (2013.01); *H04L 63/0281* (2013.01)

(58) Field of Classification Search
CPC ............ H04L 63/0263; H04L 63/0227; H04L 63/0281
See application file for complete search history.

(56) References Cited

U.S. PATENT DOCUMENTS

| | | | | |
|---|---|---|---|---|
| 10,594,734 | B1* | 3/2020 | Rappard | H04L 63/0236 |
| 10,601,776 | B1* | 3/2020 | Burakovsky | H04L 63/0218 |
| 2008/0235507 | A1* | 9/2008 | Ishikawa | H04L 63/0428 |
| | | | | 713/150 |
| 2012/0204251 | A1* | 8/2012 | Kopti | H04L 63/20 |
| | | | | 726/11 |

(Continued)

OTHER PUBLICATIONS

Commonly-Assigned, Co-pending U.S. Appl. No. 17/902,531 for "Methods, Systems, and Computer Readable Media for Automatic Category 1 Message Filtering Rules Configuration by Learning Topology Information from Network Function (NF) Repository Function (NRF)," (Unpublished, filed Sep. 2, 2022).

(Continued)

*Primary Examiner* — Cheng-Feng Huang
(74) *Attorney, Agent, or Firm* — Jenkins, Taylor & Hunt, P.A.

(57) ABSTRACT

A method for automatically managing a platform firewall using a network function (NF) repository function (NRF) or service communication proxy (SCP) includes receiving message relating to registering, updating, or deregistering an NF profile in an NF profiles database separate from a platform firewall. The method further includes determining that the registering, updating, or deregistering of the NF profile requires a change to a firewall rules configuration of the platform firewall. The method further includes, in response to determining that the registering, updating, or deregistering of the NF profile requires a change to the firewall rules configuration of the platform firewall, automatically updating, by the NRF or SCP, the firewall rules configuration of the platform firewall.

15 Claims, 6 Drawing Sheets

(56) References Cited

U.S. PATENT DOCUMENTS

| 2014/0245423 | A1* | 8/2014 | Lee | H04L 63/20 |
| | | | | 726/12 |
| 2019/0230556 | A1* | 7/2019 | Lee | H04W 28/16 |
| 2020/0162429 | A1* | 5/2020 | Burakovsky | H04L 63/0892 |
| 2020/0162514 | A1* | 5/2020 | Rappard | H04W 24/08 |

OTHER PUBLICATIONS

Notification of Transmittal of the International Search Report and the Written Opinion of the International Searching Authority, or the Declaration for International Application No. PCT/US2022/023812 (dated Jul. 22, 2022).

"OAuth 2.0," Swagger, pp. 1-6 (2022).

"3rd Generation Partnership Project; Technical Specification Group Services and System Aspects; System architecture for the 5G System (5GS); Stage 2 (Release 17)," 3GPP TS 23.501, V17.5.0, pp. 1-568 (Jun. 2022).

"3rd Generation Partnership Project; Technical Specification Group Services and System Aspects; Procedures for the 5G System (5GS); Stage 2 (Release 17)," 3GPP TS 23.502, V17.4.0, pp. 1-738 (Mar. 2022).

"3rd Generation Partnership Project; Technical Specification Group Core Network and Terminals; 5G System; Public Land Mobile Network (PLMN) Interconnection; Stage 3 (Release 17)," 3GPP TS 29.573, V17.4.0, pp. 1-106 (Mar. 2022).

"5G Interconnect Security," GSMA, Version 2.0, pp. 1-61 (Jun. 3, 2021).

"3rd Generation Partnership Project; Technical Specification Group Services and System Aspects; Security Aspects; Study on security aspects of the 5G Service Based Architecture (SBA) (Release 16)," 3GPP TR 33.855, V16.1.0, pp. 1-103 (Sep. 2020).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"Functionality to be Deployed in Different Locations," Ericsson, https://www.ericsson.com/en/future-technologies/architecture/network-architecture-domains, pp. 1-20 (2021).

Dredge, "The Service Communication Proxy: 5G Caught Up in a Service Mesh," Metaswitch, pp. 1-10 (Feb. 14, 2020).

Girondi, "Efficient Traffic Monitoring in 5G Core Network," KTH Royal Institute of Technology, pp. 1-118 (2020).

"Ultra Cloud Core 5G Policy Control Function, Release Mar. 2020—Configuration and Administration Guide," Cisco, https://www.cisco.com/c/en/us/td/docs/wireless/ucc/pcf/2020-03-0/b_ucc-5g-pcf-config-and-admin-guide_2020-03/m_5g-pcf-overview.html#id_121328 , pp. 1-7 (Mar. 2020).

"Making 5G a Reality," NEC Corporation, pp. 1-32 (2018).

Commonly-Assigned, co-pending U.S. Appl. No. 17/984,287 for "Methods, Systems, and Computer Readable Media for Providing Shared Security Edge Protection Proxy (SEPP) for Roaming Aggregators" (Unpublished, filed Nov. 10, 2022).

Alcala-Martin et al., "Global Mobile Network Aggregators: Taxonomy, Roaming Performance and Optimization," ACM, pp. 1-13 (2022).

"OAuth 2.0," Swagger, https://swagger.io/docs/specification/authentication/oauth2/, pp. 1-6 (2022).

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

"5G Interconnect Security," GSMA, Version 2.0, FS.36, pp. 1-61 (Jun. 3, 2021).

Salva-Garcia et al., "5G NB-Iot: Efficient Network Traffic Filtering for Multitenant IoT Cellular Network," Security and Communications Networks, vol. 2018, pp. 1-22 (2018).

* cited by examiner

METHODS, SYSTEMS, AND COMPUTER READABLE MEDIA FOR PLATFORM FIREWALL MANAGEMENT BY NETWORK FUNCTION (NF) REPOSITORY FUNCTION (NRF) OR SERVICE COMMUNICATION PROXY (SCP)

TECHNICAL FIELD

The subject matter described herein relates to security in telecommunications networks. More particularly, the subject matter described herein relates to methods, systems, and computer readable media for platform firewall management by an NRF or an SCP.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is that configuring firewalls that protect the networks by filtering packets entering and/or exiting the networks is labor intensive and prone to errors. A firewall that protects a 5G (or subsequent generation) core network by filtering packets entering and/or exiting the network is referred to herein as a platform firewall.

5G NFs are deployed in networks which are secured with firewall rules to filter packets based on source and destination IP addresses, source and destination ports and protocol, in addition to other 5G-defined security mechanisms. One of the configuration challenges that occurs is keeping the firewall rules in sync with the 5G NF topology changes made with the NRF as changes to NF profiles containing 5G NFs IP addresses and port details. Performing such configuration manually would be time and labor intensive and subject to error. For example, NF profiles can change rapidly, especially in cloud network implementations of 5G systems, as NF instances are instantiated, updated, and removed from service. A platform firewall that protects a 5G network needs to be updated based on changes in network topology. However, there is no defined mechanism for keeping platform firewall rules synchronized with NF profile changes in the 5G network.

In light of these and other difficulties, there exists a need for improved methods, systems, and computer readable media for managing a platform firewall.

SUMMARY

A method for automatically managing a platform firewall using a network function (NF) repository function (NRF) or service communication proxy (SCP) includes receiving message relating to registering, updating, or deregistering an NF profile in an NF profiles database separate from a platform firewall. The method further includes determining that the registering, updating, or deregistering of the NF profile requires a change to a firewall rules configuration of the platform firewall. The method further includes, in response to determining that the registering, updating, or deregistering of the NF profile requires a change to the firewall rules configuration of the platform firewall, automatically updating, by the NRF or SCP, the firewall rules configuration of the platform firewall.

According to another aspect of the subject matter described herein, receiving a message relating to registering, updating, or deregistering the NF profile includes receiving an NFRegister request or response relating to registering the NF profile with the NRF.

According to another aspect of the subject matter described herein, automatically updating the firewall rules configuration of the platform firewall includes adding a rule to the firewall rules configuration to filter packet traffic to or from the NF.

According to another aspect of the subject matter described herein, receiving a message relating to registering, updating, or deregistering the NF profile includes receiving an NFUpdate request or response relating to updating the NF profile with the NRF.

According to another aspect of the subject matter described herein, automatically updating the configuration of the platform firewall includes updating a rule of the firewall rules configuration to filter packet traffic to or from the NF.

According to another aspect of the subject matter described herein, the method for automatically updating a rules configuration of a platform firewall includes determining that the message relating to registering, updating, or deregistering the NF profile includes a fully qualified domain name (FQDN) of the NF and wherein the method further comprises querying a DNS server to resolve the FQDN of the NF to an Internet protocol (IP) address of the NF.

According to another aspect of the subject matter described herein, receiving a message relating to registering, updating, or deregistering the NF profile includes receiving an NFDeregister request or response relating to deregistering the NF profile with the NRF.

According to another aspect of the subject matter described herein, automatically updating the configuration of the platform firewall includes deleting a rule of the firewall rules configuration corresponding to the NF profile.

According to another aspect of the subject matter described herein, automatically updating the configuration of the platform firewall includes invoking a configuration application programming interface (API) of the platform firewall.

According to another aspect of the subject matter described herein, automatically updating the configuration of the platform firewall includes updating a plurality of platform firewalls located at different network sites.

According to another aspect of the subject matter described herein, a system for automatically managing a platform firewall is provided. The system includes a network function (NF) repository function (NRF) or service communication proxy (SCP) including at least one processor and a memory. The system further includes a platform firewall rules configuration manager for receiving a message relating to registering, updating, or deregistering an NF profile in an NF profiles database separate from a platform firewall, determining that the registering, updating, or deregistering of the NF profile requires a change to a firewall rules configuration of a platform firewall, and, in response to determining that the registering, updating, or deregistering of the NF profile requires a change to the firewall rules configuration of the platform firewall, automatically updating, by the NRF or SCP, the firewall rules configuration of the platform firewall.

According to another aspect of the subject matter described herein, the message relating to registering, updating, or deregistering the NF profile includes an NFRegister request or response relating to registering the NF profile with the NRF.

According to another aspect of the subject matter described herein, in automatically updating the configuration of the platform firewall, the platform firewall rules configuration manager is configured to add a rule to the firewall rules configuration to filter packet traffic to or from the NF.

According to another aspect of the subject matter described herein, the message relating to registering, updating, or deregistering the NF profile includes an NFUpdate request or response relating to updating the NF profile with the NRF.

According to another aspect of the subject matter described herein, in automatically updating the configuration of the platform firewall, the platform firewall rules configuration manager is configured to update a rule of the firewall rules configuration to filter packet traffic to or from the NF.

According to another aspect of the subject matter described herein, the platform firewall rules configuration manager is configured to determine that the message relating to the registering, updating, or deregistering the NF profile includes a fully qualified domain name (FQDN) of the NF and to query a DNS server to resolve the FQDN of the NF to an Internet protocol (IP) address of the NF.

According to another aspect of the subject matter described herein, the message relating to registering, updating, or deregistering the NF profile includes an NFDeregister request or response relating to deregistering the NF profile with the NRF and wherein, in automatically updating the configuration of the platform firewall, the platform firewall rules configuration manager is configured to delete a rule of the firewall rules configuration corresponding to the NF profile identified in the NFDeregister request or response.

According to another aspect of the subject matter described herein, in automatically updating the configuration of the platform firewall, the platform firewall rules configuration manager is configured to invoke a configuration application programming interface (API) of the platform firewall.

According to another aspect of the subject matter described herein, the platform firewall rules configuration manager is configured to update rules configurations of a plurality of platform firewalls located at different network sites.

According to another aspect of the subject matter described herein, a non-transitory computer readable medium having stored thereon executable instructions that when executed by a processor of a computer control the computer to perform steps is provided. The steps are performed at a network function (NF) repository function (NRF) or service communication proxy (SCP) implemented by at least one processor. The steps further include receiving a message relating to registering, updating, or deregistering an NF profile in an NF profiles database separate from a platform firewall. The steps further include determining that the registering, updating, or deregistering of the NF profile requires a change to a firewall rules configuration of a platform firewall. The steps further include, in response to determining that the registering, updating, or deregistering of the NF profile requires a change to the firewall rules configuration of the platform firewall, automatically updating, by the NRF or SCP, the firewall rules configuration of the platform firewall.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
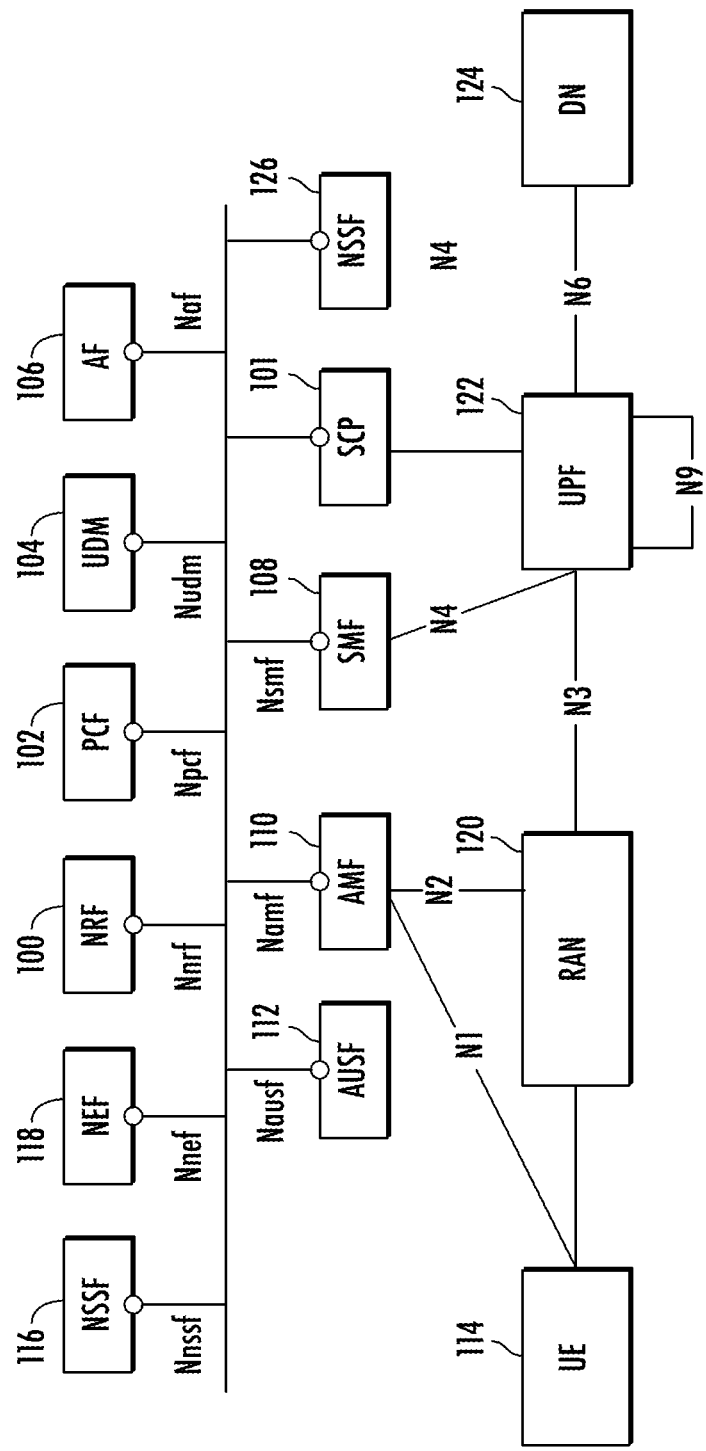
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipments (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
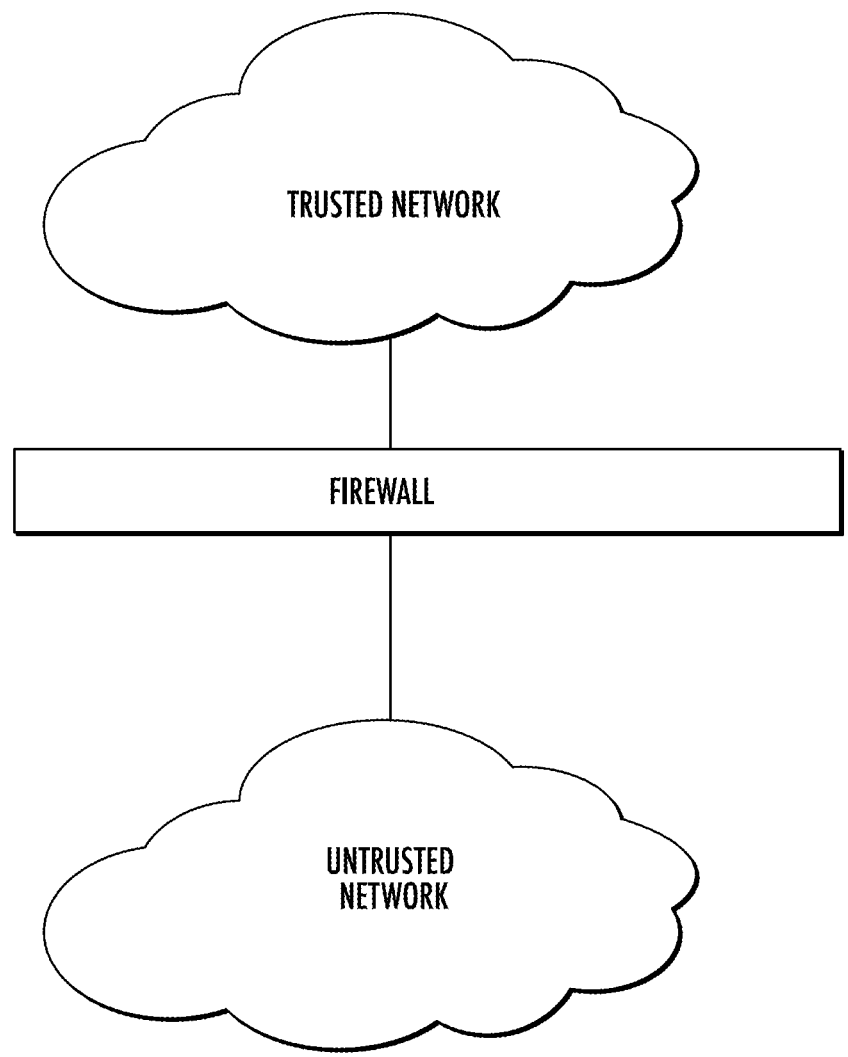
FIG. 2 is a network diagram illustrating a firewall positioned between a trusted network and an untrusted network.

FIG. 2 is a network diagram illustrating an exemplary firewall located between a trusted network and an untrusted network. In general, a firewall is a network security system that monitors and controls incoming and outgoing network traffic based on predetermined security rules. A firewall typically establishes a barrier between a trusted network and an untrusted network. One type of network firewall is a packet filter, which inspects packets transferred between 5G entities. In some instances, packets are filtered based on source and destination IP addresses, source and destination ports, and protocol.

As described above, one problem that can occur in 5G networks is the management of platform firewalls that protect the 5G network. Specifically, there is a need to make sure that firewall rules are synchronized with changes in NF profiles that occur at the NRF. The NF profile is a data structure with attributes defined in 3GPP TS 29.510. An exemplary listing of NF profile attributes is found in Table 6.2.6.2.3-1 of 3GPP TS 29.510. Updates to any of these attributes may be used to trigger an automatic update to a platform firewall rules configuration.

The following listing illustrates examples of NF profile attributes that may be included in platform firewall rules and whose updating may be used to trigger automated updates to platform firewall rules configurations.
- fully qualified domain name (FQDN) of the network function;
- IPv4 addresses of the network function;
- IPv6 addresses of the network function;
- FQDN of the service instance; and
- IpEndPoint: IP addresses and port information of the network function,
- where the service is listening for incoming service requests.

Additional or alternative attributes from Table 6.2.6.2.3-1 of 3GPP TS 29.510 may be used to configure platform firewall rules. Because the NRF stores NF profiles of NFs that are registered to be discovered by other NFs in the network, the NRF has most, if not all, of the information required to configure a platform firewall. However, there is no defined mechanism for updating the firewall rule set used by the platform firewall to filter packets as NF profiles are added, updated, or deleted at the NRF.

The platform firewall generally exposes configuration APIs to automate the firewall configuration process. For example, some platform firewalls expose a representational state transfer (REST) API to configure firewall rules. However, the subject matter described herein is not limited to using a REST API to configure firewall rules. Any suitable API for configuring firewall rules is intended to be within the scope of the subject matter described herein. In addition, even though firewalls have APIs for configuration, there is no defined mechanism for synchronizing firewall rule changes with changes in NF profiles.

There is a need to configure the platform firewall as per 5G NF topology configurations and then keep the firewall in sync with the 5G NF topology updates. A manual configuration process is cumbersome and error-prone. There is a need to automate the platform firewall process. 5GC networks can span multiple sites making the manual process complex and increasing the need for automated configuration.

In one exemplary implementation, the NRF is enhanced to automatically configure platform firewall rules. The NRF monitors the NF profiles for creation/deletion/updates. The NRF determines whether a change in NF profile requires a change to a firewall rules configuration of a platform firewall rules configuration. If a change in NF profile requires a change to a firewall rules configuration, the NRF takes steps to update the corresponding platform firewall rules configuration. One such step may be to resolve FQDN to IP Addresses if IP addresses is not already provided in the NF profile or based on operator configuration. The NRF may then invoke the appropriate platform API for firewall rule creation/deletion/updates.

One example of an NF profile change that may require a change to a firewall rules configuration is an NF registration. When an NF registers with the NRF, the NF provides its NF profile to the NRF. The NF profile includes the FQDN or IP address at which the NF is to be contacted for service. Adding a new NF profile to the NRF may trigger the creation of at least one firewall rule at the platform firewall. For example, one firewall rule created in such an instance is to allow certain types of traffic to or from the IP address or FQDN of the newly registered NF.

Another example of an NF profile change that may require a change to a firewall rules configuration is an update to a contact address of an NF profile. For example, if an IP address or FQDN at which an NF is contacted for service changes, the corresponding platform firewall rule(s) should be updated with the corresponding contact address so that packets to and from the updated contact address can pass through the firewall and be filtered.

Yet another example of an NF profile change that may require a change to a firewall rules configuration is an NF profile deregistration. The deregistration of an NF profile with the NRF results in the NF profile being deleted from the NF profile database maintained by the NRF. If an NF profile is deleted, the corresponding platform firewall rules for the deleted NF profile should also be deleted, so that the contact address for the deregistered NF cannot be used to send attack traffic through the firewall.

Figure 3:
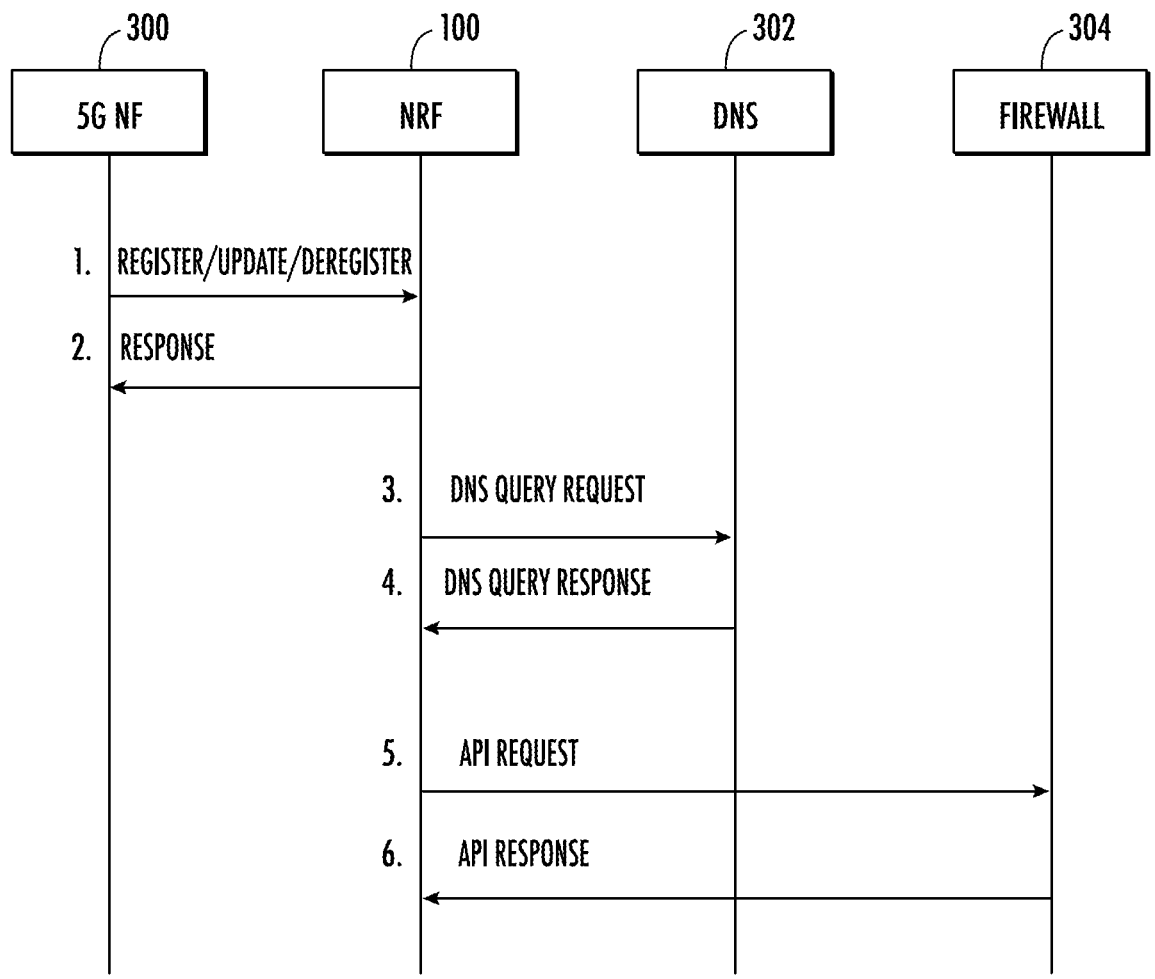
FIG. 3 is a message flow diagram illustrating exemplary messages exchanged for automatically configuring a platform firewall using an NRF.

FIG. 3 is a message flow diagram illustrating exemplary messages exchanged for configuring a platform firewall. Referring to FIG. 3, in line 1, a 5G NF 300, which may be any of the NFs illustrated in FIG. 1 sends an NFRegister, NFUpdate, or NFDeregister request to NRF 100. An NFRegister request is a message that registers an NF profile with NRF 100. The NFRegister request includes the NF profile being registered. An NFUpdate request is a message for updating one or more attributes of an NF profile registered with NRF 100. An NFDeregister message is a message for deregistering a profile currently registered with NRF 100, which results in the NF profile being deleted. In line 2 of the message flow diagram, NRF 100 returns a response to the NFRegister, NFUpdate or NFDeregister request. If the request in line 1 is an NFRegister request, and the operation is successful, the response in line 2 may be an 201 Created message. If the request in line 1 is an NFUpdate request, and the operation is successful, the response may be a 200 OK message. If the request in line 1 is an NFDeregister request, the response in line 2 may be a 201 No Content message.

Any of the NFRegister, NFUpdate, and NFDeregister operations, if successful, may require a change to a platform firewall rules configuration. Accordingly, in lines 3-6 of the message flow diagram, NRF 100 signals with DNS server 302 and platform firewall 304 to update one or more firewall rules. For example, in line 3, NRF 100 sends a DNS query to DNS server 402 to resolve an FQDN in an NF profile that was updated or created by one of the operations in line 1 into an IP address. In line 4, DNS server 402 responds to the query with one or more IP addresses corresponding to the FQDN in the DNS query. It should be noted that the DNS query in line 3 is optional and may be omitted if the NF profile includes an IP address instead of an FQDN to identify the NF or NF instance.

Once NRF 100 receives the IP address or other parameter needed to update one or more firewall rules, in line 5, NRF 100 invokes the appropriate platform firewall configuration API to update one or more firewall rules used by platform firewall 304. Invoking the platform firewall configuration API may include transmitting a message formatted according to the API to platform firewall 304 and including the updated firewall rule parameters. Platform firewall 304 receives the message, authenticates the sender, updates one or more of its packet filtering rules using the updated NF profile information received from NRF 100, and, in line 6, returns a response to NRF 100 indicating that the NF rule update was successful.

In order to configure platform firewall 304, NRF 100 may utilize the attributes in Table 1 below:

TABLE 1

NRF Configuration Attributes for Accessing Platform Firewall Configuration API

| Attribute | Description |
|---|---|
| API Endpoint | Platform firewall configuration API endpoint, e.g., FQDN |
| API Prefix | Platform firewall configuration API prefix (optional) |
| Security Credentials | Security credentials to access the platform firewall configuration API |

From Table 1, the parameters needed to access the platform firewall configuration API include the API endpoint, which may be an FQDN or IP address and port number of the endpoint for receiving firewall rules configuration parameters. The parameters may also include an API prefix. The configuration parameters may further include security credentials, such as login credentials, for accessing the platform firewall configuration API.

Figure 4:
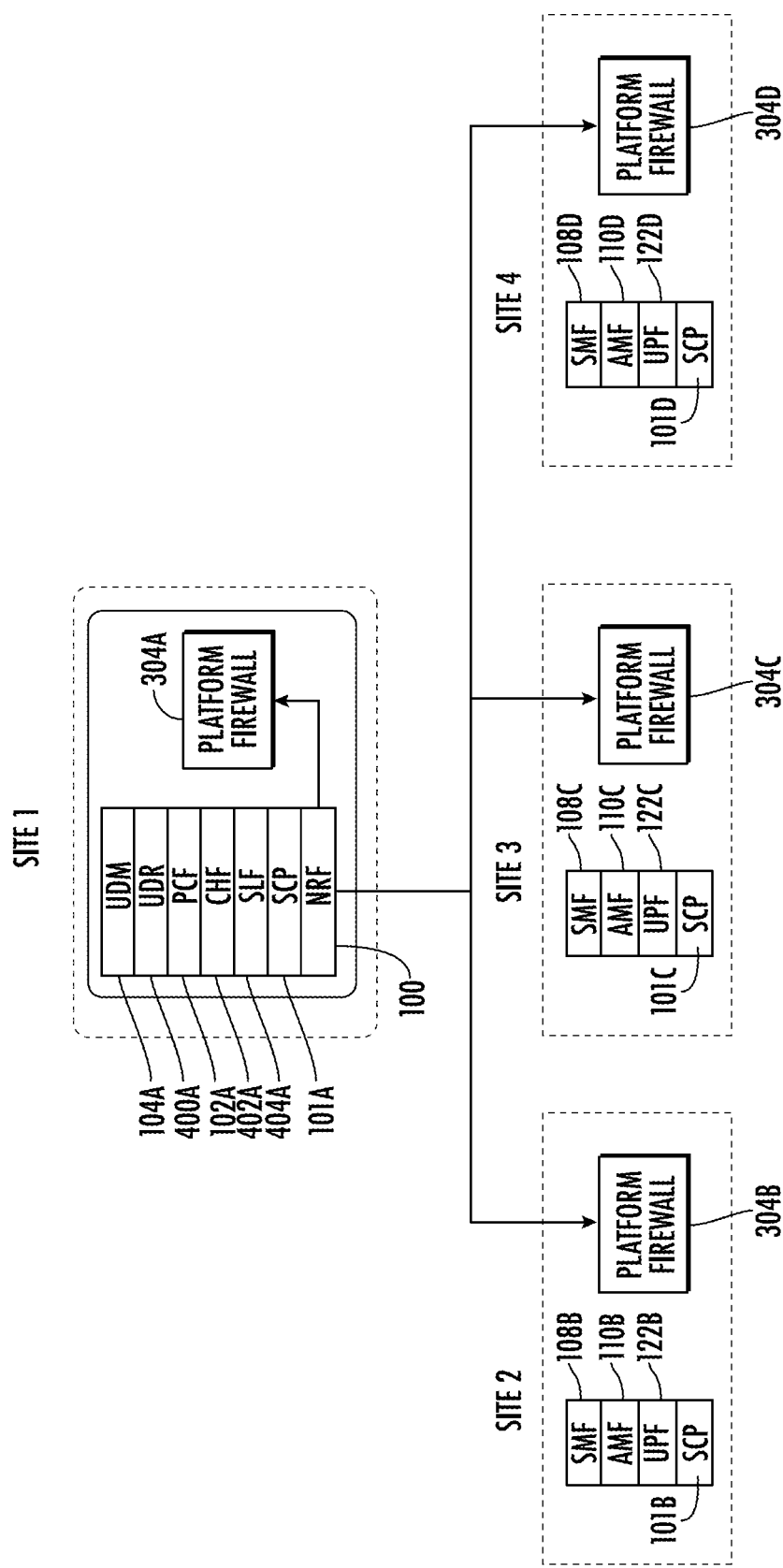
FIG. 4 is a network diagram illustrating an NRF managing multiple platform firewalls located at different sites.

An NRF configured as described above to automatically configure a platform firewall may be used to configure multiple platform firewalls located at different sites. FIG. 4 illustrates such an implementation. Referring to FIG. 4, NRF 100 is located at site 1, which may also include platform firewall 304A as well as UDM 104A, unified data repository (UDR) 400A, PCF 102A, charging function (CHF) 402A, subscription locator function (SLF) 404A, and SCP 101A. Site 2 includes platform firewall 304B, SMF 108B, AMF 110B, UPF 122B, and SCP 101B. Site 3 includes platform firewall 304C, SMF 108C, AMF 110C, UPF 122C, and SCP 101C. Site 4 includes platform firewall 304D, SMF 108D, AMF 110D, UPF 122D, and SCP 101D. NRF 100 receives NF profile updates from NFs located at sites 1-4 and updates platform firewalls 304A-3040 based on the NF profile updates. For example, if SCP 101D located in site 4 updates its NF profile with NRF 100, NRF 100 may update firewall rules with any or all of platform firewalls 304A-3040 that have parameters affected by the NF profile update. One example of such a rule may be to allow traffic from the IP address of SCP 101D. If the IP address of SCP 101D changes because of an NF profile update, NRF 100 may update the firewall rules in each of platform firewalls 304A-3040 to allow traffic from the new IP address of SCP 101D.

It should be noted that NRF 100 may maintain different rules configurations for each of platform firewalls 304A-3040, where the different configurations contain site-specific packet filtering rules for each firewall. For example, for platform firewall 304A located at site 1, NRF 100 may maintain and automatically update a firewall rules configuration for filtering packets to or from IP addresses associated with UDM 104A, UDR 400A, PCF 102A, SLF 404A, SCP 101A, and NRF 100. For platform firewall 304B located at site 2, NRF 100 may maintain and automatically update a firewall rules configuration for filtering packets to or from SMF 108B, AMF 110B, UPF 122B, and SCP 101B. For platform firewall 304C located at site 3, NRF 100 may maintain and automatically update a firewall rules configuration for filtering packets to or from SMF 108C, AMF 110C, UPF 122C, and SCP 101C. For platform firewall 304D located at site 4, NRF 100 may maintain and automatically update a firewall rules configuration for filtering packets to or from SMF 108D, AMF 110D, UPF 122D, and SCP 101D.

Figure 5:
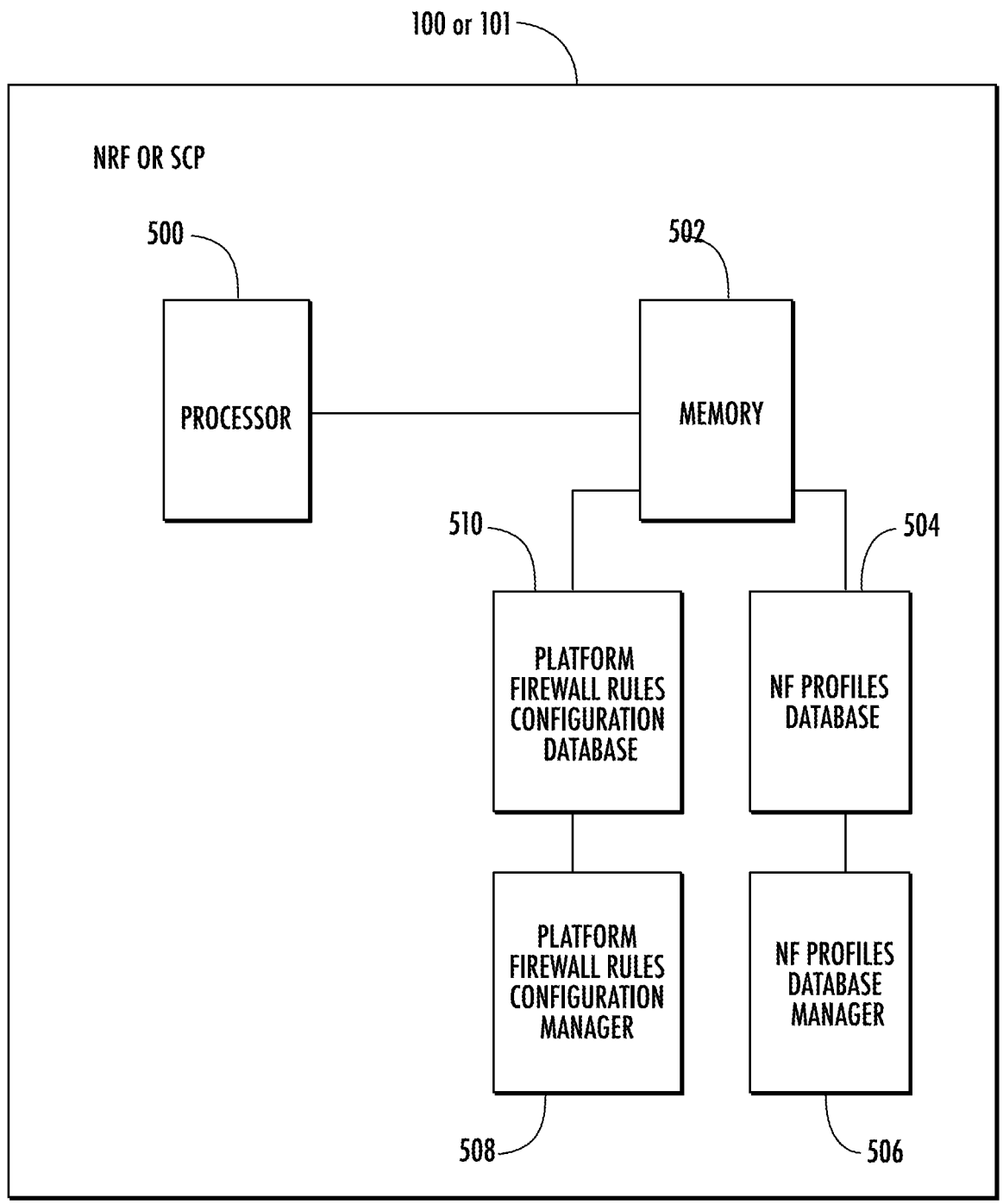
FIG. 5 is a block diagram illustrating an exemplary architecture for an NRF or SCP for automatically managing a platform firewall.

In the examples described above, the process for automatically managing a platform firewall is performed by NRF 100. In an alternate implementation, automated platform firewall management may be performed by SCP 101. FIG. 5 is a block diagram illustrating an exemplary architecture for NRF 100 or an SCP 101 capable of automatically updating platform firewall rules in response to NF profile changes. Referring to FIG. 5, NRF 100 or SCP 101 includes at least one processor 500 and memory 502. If the automatic platform firewall database updating is implemented at an NRF, the NRF 100 further includes an NF profiles database 504 for storing NF profiles of NFs registered with NRF 100 and an NF profiles database manager 506 for updating NF profiles database 504 in response to NFRegister, NFUpdate, and NFDeregister requests from NFs. If the automatic platform firewall database updating functionality is being implemented at an SCP, NF profiles database 504 and NF profile database manager 506 may be implemented elsewhere (i.e., at the NRF) and the automatic platform firewall rules configuration updating procedures described herein may be triggered by receipt of NFRegister, NFUpdate, and NFDeregister responses from the NRF confirming successful completion of the requested service operation.

NRF 100 or SCP 101 also includes a platform firewall rules configuration manager 508 for performing the steps described herein for updating firewall rules managed by a platform firewall in response to NF profile updates. Platform firewall rules configuration manager 508 may be implemented using computer executable instructions stored in memory 502 and executed by processor 500. NRF 100 or SCP 101 may further include a local (master) copy 510 of a platform firewall rules configuration database. When platform firewall rules configuration manager 508 receives a request or response relating to the registering, updating, or deregistering of an NF profile, platform firewall rules configuration manager 508 may identify NF profiles or profile attributes affected by the requested service operation, access database copy 510 to identify firewall rules having the same attributes or parameters that are being updated or deleted, perform the requested firewall rule updates to local copy 510 of the platform firewall rules configuration database and distribute the needed rules configuration updates to platform firewalls being managed by platform firewall rules configuration manager 508. As described above with respect to FIG. 4, different platform firewalls may receive different rules updates, as the networks or sites that they protect may include different NF instances and thus require different firewall rules configurations.

Figure 6:
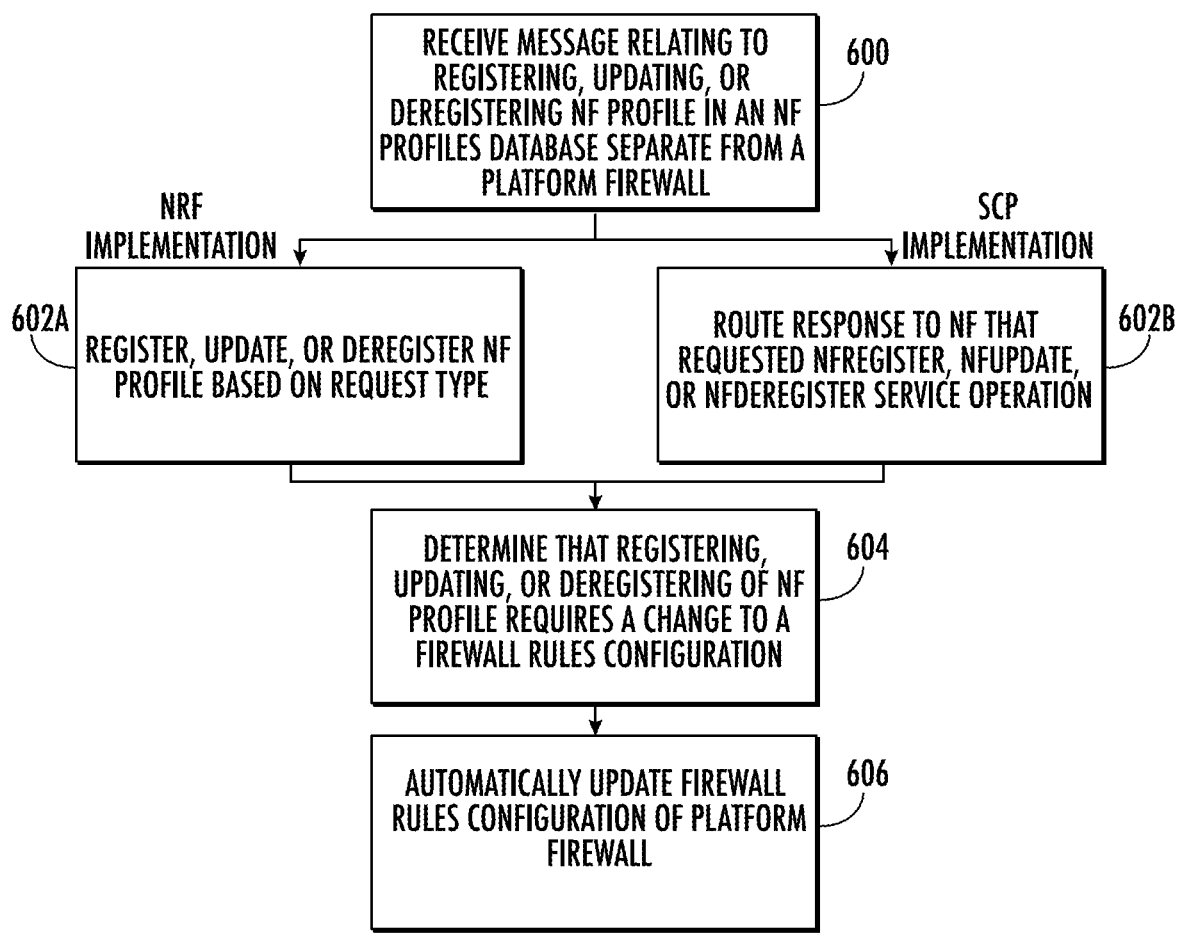
FIG. 6 is a flow chart illustrating an exemplary process for managing a platform firewall using an NRF or an SCP.

FIG. 6 is a flow chart illustrating an exemplary process for managing a platform firewall by automatically provisioning platform firewall rules in response to NF profile changes. Referring to FIG. 6, in step 600, the process includes receiving a message relating to registering, updating, or deregistering an NF profile in an NF profiles database separate from a platform firewall. For example, NRF 100 may receive an NFRegister, NFUpdate, or NFDeregister request from an NF seeking to register, update, or deregister an NF profile with NRF 100. In the case of an SCP implementation of the subject matter described herein, the automatic platform firewall rules configuration process may be triggered by receive of a response message confirming successful registering, updating, or deregistering of an NF profile. Accordingly, in an SCP implementation of the subject matter described herein, step 600 may include receiving an NFRegister, NFUpdate, or NFDeregister response message.

If the process is being implemented by an NRF, control proceeds to step 602A, where the process further includes registering, updating, or deregistering the NF profile based on a type of the request. For example, if the request is an NFRegister request, NRF 100 may register the NF by storing the NF profile in the NF profiles database. If the request is an NFUpdate request, NRF 100 may update the NF profile based on the parameters identified in the NFUpdate request. If the request is an NFDeregister request, NRF 100 may delete the NF profile identified in the NFDeregister request.

If the process is being implemented by an SCP, control proceeds from step 600 to step 602B where the SCP routes the NFRegister, NFUpdate, or NFDeregister response to the NF that requested the requested NFRegister, NFUpdate, or NFDeregister service operation.

After step 602A or 6028, control proceeds to step 604 where the process further includes determining that the registering, updating, or deregistering of the NF profile requires a change to a firewall rules configuration of a platform firewall. In the case of an NFRegister request or response, platform firewall rules configuration manager 508 may determine that a rule corresponding to the NF profile being registered needs to be added to the local (master) copy of platform firewall rules configuration database at NRF 100 or SCP 101. If the message received by NRF 100 or SCP 101 is an NFUpdate request or response, platform firewall rules configuration manager 508 may identify NF profile attributes being updated by the NFUpdate service operation and determine if the NF profile attributes being updated are used by any of the rules in the local copy of platform firewall rules configuration database at NRF 100 or SCP 101 and update the corresponding attributes in the platform firewall rules. If the message received by NRF 100 or SCP 101 is an NFDeregister request or response, platform firewall rules configuration manager 508 may determine that the rule or rules corresponding to NF profile being deregistered needs to be deleted from the platform firewall rules configuration database local to NRF 100 or SCP 101.

In step 606, the process further includes, in response to determining that the registering, updating, or deregistering of the NF profile requires a change to the firewall rules configuration of the platform firewall, automatically updating, by the NRF or SCP, the firewall rules configuration of the platform firewall. For example, platform firewall rules configuration manager 508 may invoke or use the firewall configuration API of platform firewall 304 to add, modify, or delete rules from the firewall rules configuration database. Platform firewall rules configuration manager 508 may first update the rule or rules in the local copy of the platform firewall rules configuration database. Platform firewall rules configuration manager 508 may then formulate a message in a format specified by the platform firewall rules configuration API for performing the requested firewall rules configuration update and then send the message to one or more platform firewalls to update their respective firewall rules configurations. It should be noted that the steps in FIG. 6 may be performed continually, such that synchronization between the platform firewall rules configuration(s) and NF profile changes with the NRF is maintained.

Tables 2 and 3 shown below illustrate an example of a firewall rule that may be updated in response to an NFUpdate service operation. In this example, it is assumed that the IP address of UDM1 has is changed from IP1 to IP3 by the NFUpdate service operation.

TABLE 2

Platform Firewall Rules Configuration Before Automatic Updating

| Rule Criteria | Rule Action |
|---|---|
| SourceIP = IP1, SourcePort = P1, DestIP = IP2, DestPort = P1 | Allow |
| SourceIP = IP2, SourcePort = P1, DestIP = IP1, DestPort = P1 | Allow |

TABLE 3

Platform Firewall Rules Configuration After Automatic Updating

| Rule Criteria | Rule Action |
|---|---|
| SourceIP = IP3, SourcePort = P1, DestIP = IP2, DestPort = P1 | Allow |
| SourceIP = IP2, SourcePort = P1, DestIP = IP3, DestPort = P1 | Allow |

From Table 2, before the NF profile update, the platform firewall is configured to allow traffic from IP1, Port1 to IP2, port 1, and vice versa. Such a pair of rules may be configured to allow traffic from a UDM on the protected side of the firewall and another node, such as an AMF located on the unprotected side of the firewall. In Table 3, the IP address of the UDM changes to IP3. The AMF would be informed of the change in the NF profile of the UDM by the NRF through the NF discovery service. However, without an automated firewall rules update, communications between the AMF and the UDM would be blocked by the firewall. However, by automatically updating the firewall rules configuration when the NF profile of the UDM changes, the subject matter described herein allows communications between the UDM and the AMF to continue.

The subject matter described herein may achieve one or more of the following exemplary advantages:

- Automation of firewall configuration for on-demand topology changes (e.g. network slice additions/deletions/updates)
  The dynamic nature of cloud native topology, which changes frequently, demands automation, as manual changes cannot keep up with the pace of topology changes. By automating platform firewall configuration rules changes and synchronizing the changes with NF profile updates at the NRF, the subject matter described herein can keep firewall rules configuration updates synchronized with changes in NF profiles caused by cloud native network topology changes.
- 5G includes the concept of network slices, which further adds to the topology changes. The automated platform firewall configuration update methodology described herein can keep firewall rules configuration updates synchronized with changes in NF profile cause by allocation of resources to network slices and deallocation of resources from network slices.
- The platform firewall rules configuration is continually monitored/audited for changes. For example, the NRF or SCP may continually monitor NFRegister, NFUpdate, and NFDeregister operations for changes that require updates to platform firewall rules and perform the operations described herein for updating the platform firewall rules.
- Using the NRF (or SCP) to automate updates to a platform firewall rules configuration provides enhanced security by ensuring that the firewall rules configuration is synchronized with NF profile updates at the NRF.
- Using the NRF to automate updates to a platform firewall rules configuration is easy to implement because the NRF is already tasked with updating parameters in NF profiles, which may also be used by platform firewall rules.
- As described above, the subject matter described herein for automatically updating firewall rules can also be implemented at an SCP instead of an NRF. For example, the SCP may receive NFRegister, NFUpdate, or NFDeregister responses confirming successful registering, updating, or deleting of an NF profile with the NRF and perform the steps described herein for automatically updating a platform firewall rules configuration. Thus, an SCP may implement automate platform firewall rules configuration updates in addition to its normal message routing functionality.

The disclosure of each of the following references is hereby incorporated herein by reference in its entirety.

REFERENCES 1. 3rd Generation Partnership Project; Technical Specification Group Services and System Aspects; System architecture for the 5G System (5GS); Stage 2 (Release 17) 3GPP TS 23.501 V17.0.0 (2021-03).
2. 3rd Generation Partnership Project; Technical Specification Group Core Network and Terminals; 5G System; Network Function Repository Services; Stage 3 (Release 17) 3GPP TS 29.510 V17.1.0 (2021-03).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatically managing a platform firewall using a network function (NF) repository function (NRF) or service communication proxy (SCP), the method comprising:

at an NRF or SCP implemented by at least one processor:
receiving a message relating to registering, updating, or deregistering an NF profile in an NF profiles database separate from a platform firewall, wherein receiving a message relating to registering, updating, or deregistering the NF profile includes receiving an NFRegister request or response relating to registering the NF profile with the NRF;
determining that the registering, updating, or deregistering of the NF profile requires a change to a firewall rules configuration of the platform firewall; and
in response to determining that the registering, updating, or deregistering of the NF profile requires a change to the firewall rules configuration of the platform firewall, automatically updating, by the NRF or SCP, the firewall rules configuration of the platform firewall, wherein automatically updating the configuration of the platform firewall includes adding a rule to the platform firewall rules configuration to filter packet traffic to or from the NF.

2. The method of claim 1 wherein receiving a message relating to registering, updating, or deregistering the NF profile includes receiving an NFUpdate request or response relating to updating the NF profile with the NRF.

3. The method of claim 2 wherein automatically updating the configuration of the platform firewall includes updating a rule of the platform firewall rules configuration to filter packet traffic to or from the NF.

4. The method of claim 1 comprising determining that the message relating to registering, updating, or deregistering the NF profile includes a fully qualified domain name (FQDN) of the NF and wherein the method further comprises querying a DNS server to resolve the FQDN of the NF to an Internet protocol (IP) address of the NF.

5. The method of claim 1 wherein receiving a message relating to registering, updating, or deregistering the NF profile includes receiving an NFDeregister request or response relating to deregistering the NF profile with the NRF.

6. The method of claim 5 wherein automatically updating the configuration of the platform firewall includes deleting a rule of the firewall rules configuration corresponding to the NF profile.

7. The method of claim 1 wherein automatically updating the firewall rules configuration of the platform firewall includes invoking a configuration application programming interface (API) of the platform firewall.

8. The method of claim 1 wherein automatically updating the configuration of the platform firewall includes updating a plurality of platform firewalls located at different network sites.

9. A system for automatically managing a platform firewall, the system comprising:

a network function (NF) repository function (NRF) or service communication proxy (SCP) including at least one processor and a memory; and
a platform firewall rules configuration manager for receiving a message relating to registering, updating, or deregistering an NF profile in an NF profiles database separate from a platform firewall, determining that the registering, updating, or deregistering of the NF profile requires a change to a firewall rules configuration of the platform firewall, and, in response to determining that the registering, updating, or deregistering of the NF profile requires a change to the firewall rules configuration of the platform firewall, automatically updating, by the NRF, the firewall rules configuration of the platform firewall, wherein the message relating to registering, updating, or deregistering the NF profile includes an NFRegister request or response relating to registering the NF profile with the NRF and wherein, in automatically updating the firewall rules configuration of the platform firewall, the platform firewall rules configuration manager is configured to add a rule to the platform firewall rules configuration to filter packet traffic to or from the NF.

10. A system for automatically managing a platform firewall, the system comprising:

a network function (NF) repository function (NRF) or service communication proxy (SCP) including at least one processor and a memory; and
a platform firewall rules configuration manager for receiving a message relating to registering, updating, or deregistering an NF profile in an NF profiles database separate from a platform firewall, determining that the registering, updating, or deregistering of the NF profile requires a change to a firewall rules configuration of the platform firewall, and, in response to determining that the registering, updating, or deregistering of the NF profile requires a change to the firewall rules configuration of the platform firewall, automatically updating, by the NRF, the firewall rules configuration of the platform firewall, wherein the message relating to registering, updating, or deregistering the NF profile includes an NFUpdate request or response relating to updating the NF profile with the NRF and wherein, in automatically updating the firewall rules configuration of the platform firewall, the platform firewall rules configuration manager is configured to update a rule of the platform firewall rules configuration to filter packet traffic to or from the NF.

11. The system of claim 9 wherein the platform firewall rules configuration manager is configured to determine that the message relating to registering, updating, or deregistering the NF profile includes a fully qualified domain name (FQDN) of the NF and to query a DNS server to resolve the FQDN of the NF to an Internet protocol (IP) address of the NF.

12. A system for automatically managing a platform firewall, the system comprising:

a network function (NF) repository function (NRF) or service communication proxy (SCP) including at least one processor and a memory; and
a platform firewall rules configuration manager for receiving a message relating to registering, updating, or deregistering an NF profile in an NF profiles database separate from a platform firewall, determining that the registering, updating, or deregistering of the NF profile requires a change to a firewall rules configuration of the platform firewall, and, in response to determining that the registering, updating, or deregistering of the NF profile requires a change to the firewall rules configuration of the platform firewall, automatically updating, by the NRF, the firewall rules configuration of the platform firewall, wherein the message relating to registering, updating, or deregistering the NF profile includes an NFDeregister request or response relating to deregistering the NF profile with the NRF and wherein, in automatically updating the configuration of the platform firewall, the platform firewall rules configuration manager is configured to delete a rule of the firewall rules configuration corresponding to the NF profile.

13. The system of claim 9 wherein, in automatically updating the configuration of the platform firewall, the platform firewall rules configuration manager is configured to invoke a configuration application programming interface (API) of the platform firewall.

14. The system of claim 9 wherein the platform firewall rules configuration manager is configured to update firewall rules configurations of a plurality of platform firewalls located at different network sites.

15. A non-transitory computer readable medium having stored thereon executable instructions that when executed by a processor of a computer control the computer to perform steps comprising:

at a network function (NF) repository function (NRF) or service communication proxy (SCP) implemented by at least one processor:

receiving a message relating to registering, updating, or deregistering an NF profile in an NF profiles database separate from a platform firewall, wherein receiving a message relating to registering, updating, or deregistering the NF profile includes receiving an NFRegister request or response relating to registering the NF profile with the NRF;

determining that the registering, updating, or deregistering of the NF profile requires a change to a firewall rules configuration of the platform firewall; and in response to determining that the registering, updating, or deregistering of the NF profile requires a change to the firewall rules configuration of the platform firewall, automatically updating, by the NRF or SCP, the firewall rules configuration of the platform firewall, wherein automatically updating the configuration of the platform firewall includes adding a rule to the platform firewall rules configuration to filter packet traffic to or from the NF.

* * * * *

UNITED STATES PATENT AND TRADEMARK OFFICE
CERTIFICATE OF CORRECTION

| | |
|---|---|
| PATENT NO. | : 11,843,580 B2 |
| APPLICATION NO. | : 17/308018 |
| DATED | : December 12, 2023 |
| INVENTOR(S) | : Rajput et al. |

It is certified that error appears in the above-identified patent and that said Letters Patent is hereby corrected as shown below:

In the Specification

In Column 9, Line 3, delete "3040" and insert -- 304D --, therefor.

In Column 9, Line 6, delete "3040" and insert -- 304D --, therefor.

In Column 9, Line 11, delete "3040" and insert -- 304D --, therefor.

In Column 9, Line 15, delete "3040," and insert -- 304D, --, therefor.

Signed and Sealed this
Twenty-fifth Day of June, 2024

Katherine Kelly Vidal
*Director of the United States Patent and Trademark Office*